Feb. 4, 1930.  C. W. McKINLEY  1,746,222
OIL FILTER
Filed May 6, 1927

Inventor
Charles W. McKinley
By Blackmore, Spencer & Fluke
Attorneys

Patented Feb. 4, 1930

1,746,222

UNITED STATES PATENT OFFICE

CHARLES W. McKINLEY, OF FLINT, MICHIGAN, ASSIGNOR TO A C SPARK PLUG COMPANY, OF FLINT, MICHIGAN, A COMPANY OF MICHIGAN

OIL FILTER

Application filed May 6, 1927. Serial No. 189,407.

This invention relates to oil filters on automotive vehicles and particularly to the filtering material thereof.

The filtering material now used for crankcase oil does not restore the bright color to the oil which is due to the fact that the filtering materials are unable to remove the very fine sediment that gives the black color to the oil. If a filtering medium is used which is fine enough to remove this sediment the filter will clog very quickly and refuse to function. It is the object of the present invention to provide a filtering material which will remove this fine sediment and at the same time will not clog quickly.

The fine sediment forms only a very small portion of the total impurities (perhaps 2 to 5%) so that the filtering material used to collect this finer sediment need be only of a small area as compared to the total filter area.

To accomplish the object of the invention I make use of the conventional spirally wound bag filter and along with the convolutions I wrap a sheet of fabric, the texture of which is relatively finer than that of the bag and which will retain the finer particles of the sediment. This finer fabric fills up the space between the spiral folds of the filter bag and so forces the oil to pass lengthwise through the finer material after it has first been roughly filtered by the conventional filtering material. The oil passes through the filtering material in spiral grooves formed in the bag, making it easy to secure a through filtering.

The finer filtering fabric will be in one piece where the inlet for the oil is at one end of the bag and in two pieces where the inlet for the oil is at the bag center.

The invention is disclosed in the accompanying drawing in which.

Figure 1:
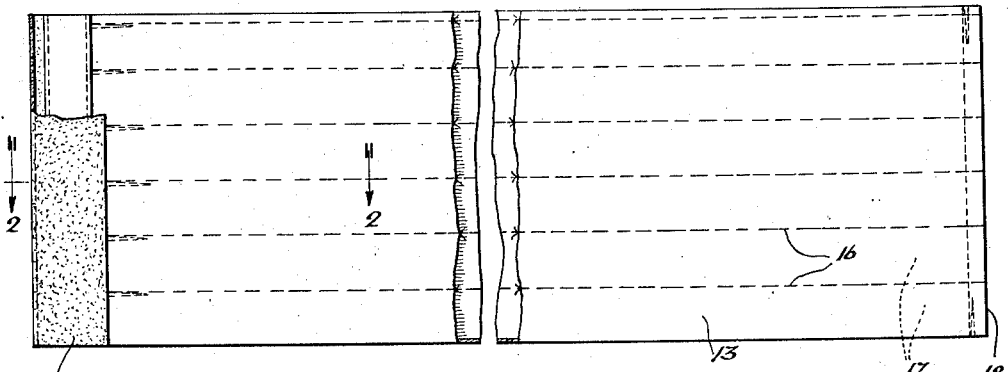
Fig. 1 is a view of the filtering bag in spread-out form with a sheet of fabric of relatively finer texture attached thereto.
Figure 2:
Fig. 2 is a section on the line 2—2 of Fig. 1.
Figure 3:
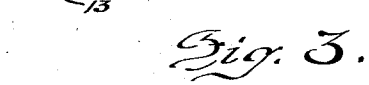
Fig. 3 is a view similar to Fig. 2 but applied to a filter bag where the oil inlet is at the center.
Figure 4:
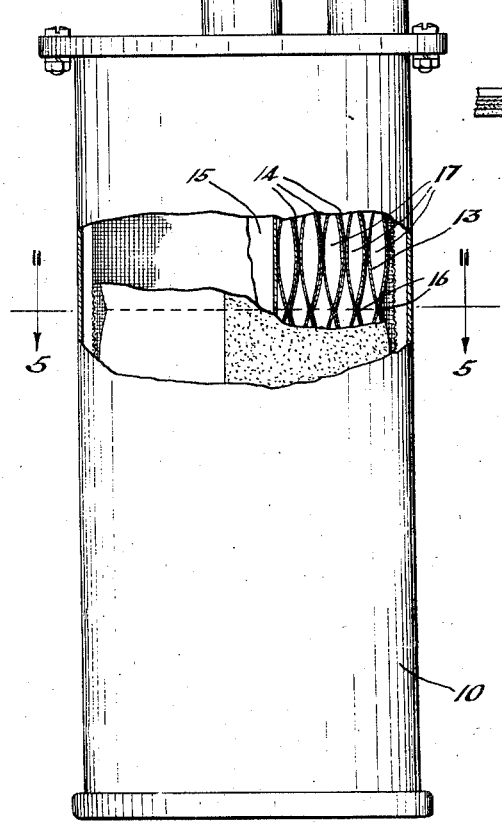
Fig. 4 is a view of a filter container showing my invention applied thereto.

Referring to the numbered parts on the drawing, 10 indicates an oil filter container having an inlet 11 and an outlet 12. Within the filter is placed a filter bag 13 which has attached to one side thereof a sheet of filter material 14 of a texture which is relatively finer than the texture of the fabric 13. The filter bag is provided with an inlet 15 which in Fig. 2 is shown at the end of the bag and in Fig. 3 at the center. Throughout the length of the filtering material seams 16 are provided which form a plurality of passages 17 through which the oil travels during the filtering operation.

Figure 5:
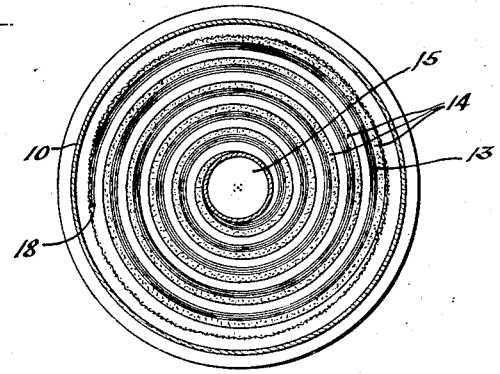
Fig. 5 is a section on the line 5—5 of Fig. 4.

Referring to Fig. 5 it will be seen that when the bag 13 is spirally wound, the fabric 14 will likewise be wound therewith in spiral form. When the end 18 of the filter bag has been reached, the finer fabric 14 is continued and wound in a complete convolution about the outside of the bag. This will give a final sheet of filtering material of relatively fine texture to catch any remaining portion of the finer sediment.

I claim:

1. In an oil filtering material, a spirally wound filter bag comprising a fabric of a relatively coarse texture to give a first stage rough filtering to the oil, and a sheet of fabric of relatively finer texture secured to said bag and wrapped with said spirals, said sheet overlying less than the whole outer surface of said bag and giving the oil a second stage filtration by causing the rough filtered oil to pass longitudinally of the finer sheet.

2. In an oil filtering material, a spirally wound filter bag comprising a fabric of a relatively coarse texture to give a first stage rough filtering to the oil, and a sheet of fabric of relatively finer texture secured to said bag and wrapped with said spirals to fine filter the oil, said sheet overlying less than the whole outer surface of said bag and giving the oil a second stage filtration by causing the rough filtered oil to pass longitudinally of the finer sheet.

3. In an oil filtering material, a spirally wound filter bag comprising a fabric of a relatively coarse texture to rough filter the oil, a series of passages formed in said filter bag to guide the oil through said spirals for rough filtering, means attached to said filtering material and overlying less than the whole outer surface of said bag to fine filter the oil from said relatively coarse texture fabric by causing the rough filtered oil to pass longitudinally of said means.

4. In an oil filtering material, a spirally wound filter bag comprising a fabric of a relatively coarse texture to rough filter the oil, a series of passages formed in said filter bag to guide the oil through said spirals for rough filtering, and a sheet of fabric of relatively fine texture attached to said bag and overlying less than the whole outer surface of said bag to fine filter the oil from said fabric by causing the rough filtered oil to pass longitudinally of said means.

5. In an oil filtering material, a spirally wound filter bag comprising a fabric of a relatively coarse texture to rough filter the oil, a series of passages formed in said filter bag to guide the oil through said spirals for rough filtering, and a sheet of fabric of a relatively finer texture attached to and wound with the spirals of said bag to fine filter the oil from said coarse texture fabric by causing the rough filtered oil to pass longitudinally of said sheet, said sheet overlying less than the whole outer surface of said bag.

6. In an oil filtering material, a spirally wound filter bag comprising a fabric of a relatively coarse texture to give a preliminary rough filtering to the oil, a series of passages formed in said filter bag to guide the oil through said spirals for rough filtering, a sheet of fabric of relatively finer texture wound with said spirals and attached to said filtering material and overlying less than the whole outer surface of said bag to fine filter the oil from said fabric by causing the rough filtered oil to pass longitudinally of said sheet, and a final spiral of said finer texture fabric completely surrounding said bag.

In testimony whereof I affix my signature.

CHARLES W. McKINLEY.